United States Patent [19]

Tabe et al.

[11] 4,324,706

[45] Apr. 13, 1982

[54] FRICTION MATERIAL

[75] Inventors: Yutaka Tabe; Hiromitsu Takamoto; Keizo Shimada, all of Iwakuni; Yasusaburo Sugita, Tokyo, all of Japan

[73] Assignees: Teijin Limited; Adebono Brake Industry Co., Ltd., both of Osaka, Japan

[21] Appl. No.: 224,967

[22] Filed: Jan. 14, 1981

[30] Foreign Application Priority Data

Jan. 22, 1980 [JP] Japan .................................. 55-5216

[51] Int. Cl.³ ............................................. C08L 21/00
[52] U.S. Cl. ...................................... 523/149; 524/15;
524/405; 524/407; 524/417; 524/423; 524/425;
524/433; 524/413; 524/430; 524/441; 524/440;
524/439; 524/436; 524/449; 524/447; 524/445;
524/451; 524/442; 524/452; 524/80; 524/538;
524/507; 524/539; 524/508; 524/540; 524/509;
524/495; 524/511; 524/496; 524/514; 524/541;
524/542

[58] Field of Search ................... 260/3, 3.3, DIG. 39, 260/998.13, 37 N, 37 EP, 38, 39 R

[56] References Cited

U.S. PATENT DOCUMENTS

| | | | |
|---|---|---|---|
| 3,967,037 | 6/1976 | Marzocchi et al. | 260/38 |
| 4,101,500 | 7/1978 | Brodsky | 260/38 |
| 4,178,278 | 12/1979 | Reynolds | 260/38 |
| 4,263,184 | 4/1981 | Leo et al. | 260/3 |

Primary Examiner—Lewis T. Jacobs
Attorney, Agent, or Firm—Burgess, Ryan and Wayne

[57] ABSTRACT

A friction material having an excellent heat-resistance, comprises 5 to 70% by weight of pulp-like particles consisting essentially of a heat-resistant aromatic polymeric material; 1 to 70% by weight of a fibrous material comprising at least one member selected from inorganic fibrous materials and heat-resistant organic fibrous materials; 1 to 35% by weight of a friction-regulating agent and; 5 to 40% by weight of a thermosetting polymeric resin.

16 Claims, 1 Drawing Figure

FRICTION MATERIAL

BACKGROUND OF THE INVENTION

The present invention relates to a friction material. More particularly, the present invention relates to a friction material useful for automobiles, railway vehicles and various industrial machines. The friction material contains, as a principal material, an inorganic substance combined with artificial pulp particles comprising a heat-resistant aromatic polymer material.

It is known that in recent years, a significant increase in size and speed of vehicles caused a great demand for improving the function of friction articles such as brake linings, disc brake pads or clutch facings in vehicles. That is, friction articles are required to have not only a high coefficient of friction when the articles are brought into contact with corresponding sliding surfaces, but also, high stability in friction performance of the friction material irrespective of any changes in temperature, sliding speed and pressure on the sliding surfaces. Also, the friction articles should exhibit excellent wear-resistance and heat-resistance. Furthermore, it is necessary that friction articles do not make abnormal noises when contacting the sliding surfaces. Heretofore, various types of friction materials containing, as a principal component, a fibrous material are known. For example, Japanese Patent Application Publication No. 46-38443 (1971) discloses a friction material which has been prepared by mixing cellulose fibers, as a principal component, with fine solid particles a phenolic resin and placing the mixture in a mold and heating the mixture in the mold at an elevated temperature under pressure. Japanese Patent Application Publication No. 46-21123 (1971) discloses a friction material which has been produced by incorporating a phenolic resin into a felt-like sheet in which an activated organic carbon is absorbed, and pressing the incorporated material in a mold at an elevated temperature under pressure. Japanese Patent Application Publication No. 48-24101 (1973) discloses a friction material which has been produced by pre-heating a mixture of wood pulp with a thermo-setting polymeric resin without pressing and pressing the preheated mixture in a mold at an elevated temperature under pressure. Also, Japanese Patent Application Laid-open No. 53-94279(1978) discloses a friction material which has been prepared in such a manner that a principal fibrous component comprising asbestos, wood pulp and inorganic fibers, for example, glass fibers or the like, are mixed with an inorganic filler and a metal oxide and, then, the mixture is converted into a sheet by a paper-making process.

Generally, the friction material usable for producing braking devices should exhibit satisfactory stable friction properties, heat-resistance and wear-resistance. When the friction material is used in a wet condition, it is necessary that the friction material have a satisfactory oil-holding property. Among the above-mentioned functions, the friction property and oil-holding property of the conventional friction materials are at a satisfactory level, respectively. Especially, the conventional friction materials containing a fibrous material, as a principal component, exhibit a superior friction property and oil-holding property under ordinary conditions. However, it is strongly desirable to enhance the friction property at an elevated temperature, for example, 250° C. or more and also the wear-resistance of the conventional friction material.

SUMMARY OF THE INVENTION

An object of the present invention is to provide a friction material having a satisfactory friction property at an elevated temperature, and superior heat-resistance and wear-resistance.

The above-mentioned object can be attained by the friction material of the present invention which comprises the following components:

(A) 5 to 70% by weight of pulp-like particles consisting essentially of a heat-resistant aromatic polymeric material;

(B) 1 to 70% by weight of a fibrous material comprising at least one member selected from the group consisting of inorganic fibrous materials and heat-resistant organic fibrous materials;

(C) 1 to 35% by weight of a friction-regulating agent, and;

(D) 5 to 40% by weight of a thermosetting polymeric resin.

DETAILED DESCRIPTION OF THE INVENTION

The friction material of the present invention comprises (A) heat-resistant pulp-like particles, (B) a heat-resistant fibrous material, (C) a friction-regulating material and (D) a thermosetting polymeric resin.

The heat-resistant pulp-like particles consist essentially of a heat-resistant aromatic polymeric material. The aromatic polymeric material usable for the present invention has a softening point of 150° C. or more, preferably, 250° C. or more, and exhibits an excellent resistance to thermal deterioration thereof at a temperature of 180° C. or more, usually, in a range of from 180° to 250° C., in the air atmosphere for a long time, for example, 1,000 hours or more. Also, it is necessary that the aromatic polymeric material can be dissolved in a certain organic solvent so as to provide a solution of the aromatic polymeric material having a concentration of 2% by weight or more, preferably, 5% by weight or more at room temperature.

The heat-resistant aromatic polymeric material contains at least 70% by weight of at least one member selected from the group consisting of:

(A) aromatic polyamides containing at least 70 molar % of at least one recurring unit selected from the group consisting of those of the formulae (I) and (II):

$$-CO-Ar_1-CONH-Ar_2-NH- \quad (I)$$

and $$-NH-Ar_3-CO- \quad (II)$$

wherein $Ar_1$, $Ar_2$ and $Ar_3$ respectively represent independently from each other, an unsubstituted or substituted divalent aromatic radical;

(B) nitrogen containing heterocyclic polymers selected from the group consisting of:

(a) aromatic polyamide imides containing at least 70 molar % of at least one recurring unit selected from those of the formula (III):

wherein X represents a divalent moiety selected from the group consisting of alkylene, alkylidene, cycloalkylene, and cycloalkylidene radicals each having 1 to 6 carbon atoms, and

—O—, —S—, —SO$_2$—, —N=N—, wherein R represents an organic group having 1 to 10 carbon atoms; $R^1$, $R^2$ and $R^3$ respectively represent, independently from each other, a member selected from the group consisting of a hydrogen atom, alkyl radicals having 1 to 6 carbon atoms, alkoxyl radicals having 1 to 3 carbon atoms, aryloxy radicals having 6 to 9 carbon atoms, alkoxy-carboxyl radicals having 2 to 10 carbon atoms, and halogen atoms, and; n and m respectively represent, independently from each other, zero or an integer of 1 to 3;

(b) aromatic polyamide imidazoles containing at least 70 molar % of at least one recurring unit selected from those of the formula (IV):

wherein X, $R^1$, $R^2$, $R^3$, m and n are as defined above;

(c) aromatic polyimides containing at least 70 molar % of at least one recurring unit selected from those of the formula (V):

wherein X, $R^1$, $R^2$, $R^3$, m and n are as defined above;

(d) aromatic polyazoles selected from the group consisting of polybenzimidazoles, polybenzoxazoles and polybenzthiazoles, each unsubstituted or substituted by at least one member selected from the group consisting of alkyl radicals having 1 to 2 carbon atoms, alkoxyl radicals having 1 to 2 carbon atoms and halogen atoms;

(e) polymers selected from the group consisting of polyquinazoline-dions, polybenzoxadinones, polyquinazolones and polyquinoxalines, and;

(f) polymers selected from the group consisting of polythiazoles, polyoxazoles, polyoxadiazoles, polyhydantoins and polyparabanic acid;

(C) aromatic polyamide hydrazides containing at least 70 molar % of at least one recurring unit selected from those of the formula (VI):

wherein $R^4$ represents a member selected from the group consisting of a hydrogen atom, alkyl radicals having 1 to 2 carbon atoms, alkoxyl radicals having 1 to 2 carbon atoms and halogen atoms;

(D) polymers containing at least 70 molar % of at least one recurring unit selected from those of the formula (VII):

wherein $R^4$ represents a radical selected from those of the following formulae:

and and X, $R^1$, $R^2$, $R^3$, m and n are as defined above;

(E) polymers selected from the group consisting of aromatic polyhydrazides and aromatic polyureas, and;

(F) polyethers selected from the group consisting of polyphenylene oxides and polyarylene oxides.

With respect to the aromatic polyamide, $Ar_1$, $Ar_2$ and $Ar_3$ in the formulae (I) and (II) may respectively comprise, independently from each other, a single aromatic ring, or two or more aromatic rings that are condensed together or are linked together by a single bond or by a bridging atom or radical, and which are oriented either meta or para. That is, $Ar_1$, $Ar_2$ and $Ar_3$ in the formulae (I) and (II), may be respectively selected, independently from each other, from the group consisting of radicals of the formulae:

and wherein $R^5$ represents a member selected from the group consisting of lower alkyl radicals having 1 to 6 carbon atoms, lower alkoxy radicals having 1 to 6 carbon atoms, halogen atoms and a nitro radical, l represents zero or an integer of from 1 to 4 and $X^1$ represents member selected from the group consisting of wherein $Y^1$ represents a member selected from the group consisting of a hydrogen atom and lower alkyl radicals having 1 to 6 carbon atoms.

Also, it is preferably that $Ar_1$, $Ar_2$ and $Ar_3$ in the formulae (I) and (II) respectively represent, independently from each other, a member selected from p-phyenylene radical, m-phenylene radical, biphenylene radical and radicals of the formulae:

and wherein $X^2$ represents a member selected from in which $Y^2$ represents a hydrogen atom or a alkyl radical having 1 to 3 carbon atoms.

The heat-resistant aromatic polyamide may be prepared by condensing at least one activated derivative of aromatic dicarboxylic acid, for example, aromatic dicarboxylic acid halide, with at least one aromatic diamine. The aromatic dicarboxylic acid may be selected from substituted and unsubstituted terephthalic acid and isophthalic acid. The aromatic diamine may be selected from substituted and unsubstituted m-phenylene diamine, 4,4'-diaminodiphenylether, 4,4'-diaminodiphenyl methane, xylylene diamine and N-methyl-p-phenylene diamine. Typical aromatic polyamides are poly-m-phenylene isophthalamide, poly-m-xylylene terephthalamide, poly-N-methyl-p-phenylene terephthal amide, and copolycondensation products of m-phenylene diamine with isophthalic acid chloride and terephthalic acid chloride.

Also, the heat-resistant aromatic polyamide usable for the present invention may be a condensation product of at least one aromatic aminocarboxylic acid, for example, p- or m-aminobenzoic acid. A typical aromatic polyamide is a condensation product of p-aminobenzoic acid.

Furthermore, the aromatic polyamide usable for the present invention may be a condensation product of at least one aromatic dicarboxylic acid halide, at least one aromatic diamine and at least one aromatic aminocarboxylic acid. For example, this type of aromatic polyamide can be prepared by condensing m-phenylene diamine, isophthalic acid chloride and hydrochloric acid salt of p-aminobenzoic acid chloride.

The aromatic polyamide imides usable for the present invention contains at least 70 molar % or more, preferably, 85 molar % or more, of at least one recurring unit of the formula (III). The aromatic polyamide imide may comprise 70 molar % or more, preferably, 85 molar % or more, of at least one recurring unit of the formula (III) and 30 molar % or less, preferably, 15 molar % or less, of at least are recurring unit selected from the group consisting of:
  polyamide imide recurring units different from those of the formula (III),
  polyamidebenzimidazole recurring units,
  aromatic polyimide recurring units,
  aromatic polyamide recurring units,
  polyazole recurring units, for example, polyoxazole, polyoxadiazole, polythiazole and polythiazole recurring units,
  polybenzazole recurring units, for example, polybenzimidazole, polybenzthiazole and polybenzoxazole recurring units,
  polyhydantoin recurring units,
  polyparabanic recurring units,
  polyquinazoline-dione recurring units,
  polyquinazolone recurring units,
  polyquinoxaline recurring units and
  polyoxadinone recurring units.

The polyamide imide recurring unit different from those of the formula (III) may be selected from the group consisting of those of the following formulae:

and wherein R² and m are as defined hereinbefore.

The aromatic polyamide hydrazides (C) containing the recurring unit of the formula (VI), the aromatic polymers (D) containing the recurring unit of the formula (VII) and the aromatic polymers (E) including aromatic polyhydrazides and aromatic polyurea, may contain, as a condensation component, at least one member selected from, aromatic dicarboxylic acids such as isophthalic acid and terephthalic acid; benzophenone tetracarboxylic acid anhydride and; pyromellitic acid anhydride.

The pulp-like particles usable for the present invention are in amorphous shape and capable of joining with each other to form aggregates. That is, the pulp-like particles may be in the form of fibers, films, flakes or ribbons each provided with a plurality of tentacle-like projections. The pulp-like particles can be prepared in such a manner that a heat-resistant aromatic polymeric material, for example, disclosed in Japanese Patent Application Laid-open No. 51-100151(1976), 51-102117(1976), 52-121524(1977) or 53-10719(1978), is dissolved in a solvent and the resultant solution is introduced into a coagulating (precipitating) liquid while agitating it at a high velocity so as to form fine amorphous particles of the coagulated polymeric material.

In the preparation of the pulp-like particles, either one or both of the solution of the heat-resistant polymeric material and the coagulating (precipitating) liquid may contain a finely divided solid material, for example, a fibrous material such as an inorganic fibrous material and a heat-resistant organic fibrous material, and a friction-regulating agent. The finely divided material is effective for causing the resultant pulp-like particles to contain therein the solid material. That is, in each of the resultant pulp-like particles, the solid material such as the fibrous material and/or the friction-regulating agent is wrapped with the polymeric material.

The above-mentioned preparation method for the pulp-like particles is effective for uniformly distributing the fibrous material and/or friction-regulating agent in the resulting friction material.

The resultant pulp-like particles are separated from the coagulating (precipitating) liquid, washed and, if necessary, dried. The pulp-like particles are effective for importing satisfactory mechanical properties to the resulting friction material and, usually, used in an amount of from 5 to 70%, preferably, from 10 to 50%, based on the entire weight of the resulting friction material. When the amount of the pulp-like particles used is less than 5%, the mechanical properties, for example, tensile strength, bending strength, of the resulting friction material is unsatisfactory. Also, when the amount of the pulp-like particles is more than 70%, the resultant friction material exhibits an unsatisfactory friction property.

The friction material of the present invention contains 1 to 70%, preferably, 2 to 50%, based on the entire weight of the friction material, of a fibrous material. The fibrous material comprises at least one member selected from the group consisting of inorganic fibrous materials and heat-resistant organic fibrous materials.

The inorganic fibrous materials may be selected from the group consisting of asbestos fibers, glass fibers, ceramic fibers, kaoline fibers, potassium titanate fibers, silica fibers, bauxite fibers, silicon carbide type ceramic fibers, boron fibers, magnesia fibers, alumina fibers, rock wool fibers, slag fibers, metal fibers and anhydrous gypsum fibers.

The heat resistant organic fibrous material may be selected from the group consisting of (A) staple fibers consisting essentially of at least one aromatic polyamide containing at least 70 molar % of at least one recurring unit selected from the group consisting of those of the formula (I) and (II), (B) staple fibers consisting essentially of at least one nitrogen containing heterocyclic polymer selected from the group consisting of:

(a) aromatic polyamide imides containing at least 70 molar % of at least one recurring unit selected from those of the formula (III);

(b) aromatic polyamide imidazoles containing at least 70 molar % of at least one recurring unit selected from those of the formula (IV);

(c) aromatic polyimides containing at least 70 molar % of at least one recurring unit selected from those of the formula (V);

(d) aromatic polyazoles selected from the group consisting of polybenzimidazoles, polybenzoxazoles and polybenzthiazoles, each unsubstituted or substituted by at least one member selected from the group consisting of alkyl radicals having 1 to 2 carbon atoms, alkoxyl radicals having 1 to 2 carbon atoms and halogen atoms;

(e) polymers selected from the group consisting of polyquinazoline-dions, polybenzoxadinones, polyquinazolones and polyquinoxalines and;

(f) polymers selected from the group consisting of polythiazoles, polyoxazoles, polyoxadiazoles, polyhydantoins and polyparabanic acid;

(C) staple fibers consisting essentially of at least one aromatic polyamide hydrazide containing at least 70 molar % of at least one recurring unit selected from those of the formula (VI);

(D) staple fibers consisting essentially of at least one polymer containing at least 70 molar % of at least one recurring unit selected from those of the formula (VII);

(E) staple fibers consisting essentially of at least one polymers selected from the group consisting of aromatic polyhydrazides and aromatic polyureas;

(F) staple fibers consisting essentially of at least one polyether selected from the group consisting of polyphenylene oxides and polyarylene oxides, and;

(G) carbon staple fibers.

The above-mentioned inorganic and organic fibers preferably have a denier of 10 or less, more preferably, 3 or less, still more preferably, 1.5 or less, and a length of 10 mm or less, more preferably, 5 mm or less. The length of the fibers may be determined in consideration of the content of the fibrous material and the type of method for producing the friction material.

As stated above, the content of the fibrous material is in a range of from 1 to 70%, preferably, 2 to 50%, based on the entire weight of the resulting friction material. When the content of the fibrous material is less than 1%, the resultant friction material exhibits a poor mechanical strength and an unsatisfactory heat-resistance. Also, when the content of the fibrous material is more than 70%, the resultant friction material exhibits a poor friction property and an unsatisfactory workability.

When the pulp-like particles are prepared by introducing a solution of a heat-resistant polymeric material into a coagulating liquid, the entire amount or a partial amount of the fibrous material to be contained in the resulting friction material, may be suspended in either one or both of the solution and the coagulating liquid, so as to cause the individual fibers in the fibrous material to be wrapped by the coagulated polymeric material.

The friction material of the present invention contains 1 to 35% of a friction-regulating agent, based on the entire weight of the friction material. The friction-regulating agent is effective for adjusting the friction property of the resulting friction material to a desired intensity.

The friction-regulating agent may comprise at least one member selected from the group consisting of finely divided alumina, silica, talc, kaoline, mica, chromium oxide, magnesium oxide, titanium dioxide, copper, copper alloys, zinc, iron, aluminium, barium sulfate, quick lime, calcium phosphate, calcium fluorite, silicon carbide, clay, beryl, mullite, chromite, ceramics, cashew nut resin, vulcanized and unvulcanized rubbers, carbon black and graphite.

The particles in the friction-regulating agent preferably has a 50 mesh size or smaller.

The content of the friction-regulating agent in the friction material can be varied in a range of from 1 to 35%, preferably, 2 to 30%, in response to the use of the friction material and the type of the friction-regulating agent.

In the case where the friction-regulating agent is non-reactive to and insoluble in the solvent used for dissolving the heat-resistant aromatic polymeric material and also, insoluble in water which is used for washing the resultant pulp-like particles, the entire amount or a partial amount of the friction-regulating agent may be suspended in either one or both of the polymeric material solution and the coagulating liquid used for producing the pulp-like particles. When the polymeric material is coagulated in the coagulating liquid to form the pulp-like particles, the individual fine particles of the friction-regulating agent are wrapped by the coagulated polymeric material. This type of resulting pulp-like particles are very useful for producing a sheet-shaped friction material to be used in oil, by using a paper-making machine.

That is, when the sheet-shaped friction material is made from a sheet-making mixture containing the pulp-like particles and the friction-regulating agent by using a paper-making machine, no friction-regulating agent is removed from the sheet-making mixture through the paper-making net, because the friction-regulating agent is contained in the pulp-like particles which do not pass through the paper-making net. Also, the friction-regulating agent can be uniformly distributed in the sheet-shaped friction material.

The friction material of the present invention contains 5 to 40%, preferably, 10 to 35%, based on the entire weight of the friction material, of a thermosetting polymeric resin. The thermosetting polymeric resin may be either in the state of a liquid or a powder.

The thermosetting polymeric resin may be selected from the group consisting of phenolic resins, melamine resins, urea resins and epoxy resins. Preferably, the phenolic resins are used as the thermosetting polymeric resin for the present invention. The phenolic resin may be a non-modified one or a modified one with an oil or a resin, for example, cashew nut resin or rosin.

In the preparation of the pulp-like particles, a portion of the amount of the thermosetting polymeric resin may be contained in the solution of the polymeric material for forming the pulp-like particles.

The friction material of the present invention can be produced from the composition containing the pulp-like particles, the fibrous material, the friction-regulating agent and the thermosetting polymeric material, by any conventional method.

For example, the brake linings, disc brake pads and clutch facings and the like are produced by the following method.

A composition of 5 to 50 parts by weight of aromatic polymer pulp-like particles, 1 to 70 parts by weight of a fibrous material, 1 to 35 parts by weight of a friction-regulating agent and 5 to 40 parts by weight of a thermosetting polymeric resin, is agitated and temporarily shaped into a desired form. The temporarily shaped composition is placed in a mold and pressed under a pressure of 50 kg/cm$^2$ or more at a temperature of from 120° to 250° C. The molded product is finished by grinding it to provide a friction article having desired dimensions. If necessary, the molded product may be heated at a temperature of from 120° to 450° C. for from 2 to 24 hours to complete the thermosetting reaction of the thermosetting polymeric resin in the molded product. This heat procedure can be carried out under a pressure of from 1 to 30 kg/cm$^2$.

Also, in the case of the production of a sheet-shaped friction material, a mixture of 5 to 70 parts by weight of pulp-like particles, 5 to 60 parts by weight of a fibrous material and 2 to 35 parts by weight of a friction-regulating agent, is subjected to a beating procedure in water to separate the pulp-like particles, the individual fibers in the fibrous material and the fine particles of the friction-regulating material, from each other. The beaten mixture is mixed with 5 to 40 parts by weight of a thermosetting polymeric resin to provide a sheet-making composition in a concentration of 0.2 to 20% by weight in water. The composition is subjected to a sheet-making process by using a long net type or tubular net type paper-making machine. The resultant sheet was pressed at a temperature of 90° to 250° C. under pressure to provide a sheet-shaped friction material.

In another method for producing the sheet-shaped friction material, the beaten mixture is directly subjected to the sheet-making process. After resultant sheet-shaped product is pressed at the above-mentioned temperature, the thermosetting polymeric resin is incorporated into the body of the sheet-shaped product, and the incorporated polymeric resin in the sheet-shaped product is thermoset at a temperature of from 90° to 250° C. to provide a sheet-shaped friction material. In this case, it is preferable that the thermosetting polymeric resin is in the state of a liquid. This method is applicable to a sheet-shaped friction material to be used in an oil phase.

SPECIFIC EXAMPLES OF THE INVENTION

The following specific examples are presented for the purpose of clarifying the present invention. However, it should be understood that these examples are intended only to illustrate the present invention and are not intended to limit the scope of the present invention in any way.

EXAMPLE 1

A mixture having the following composition:

| | |
|---|---|
| (1) Poly-m-phenylene isophthalamide pulp-like particles | 20 parts by weight |
| (2) Potassium titanate fibers | 40 parts by weight |
| (3) Cashew resin powder | 20 parts by weight |
| (4) Phenol-formaldehyde resin (powder form) | 20 parts by weight |

The mixture was agitated in a mixer for 20 minutes and the agitated mixture was temporarily shaped into a predetermined form. The temporarily shaped mixture was placed in a mold of a brake lining and pressed at a temperature of 100° C. under a pressure of 250 kg/cm$^2$ for 6 minutes. Thereafter, the shaped product was heated at a temperature of 200° C. for 4 minutes and, then, finish-ground to provide a brake lining.

The poly-m-phenylene isophthalamide pulp-like particles were prepared in such a manner that 9 parts by weight of a poly-m-phenylene isophthalamide powder having an inherent viscosity ($\eta$ ink) of 1.85 which had been determined in a concentration of 0.5 g/100 ml in 95% sulfuric acid at a temperature of 30° C., were dissolved in 91 parts by weight of N-methyl-2-pyrrolidone to provide a solution. 0.5 kg/min of the solution and 10 kg/min of a coagulating liquid consisting of 30% by weight of N-methyl-2-pyrrolidone and 70% by weight of water, were concurrently fed into a tube-agitation type precipitating apparatus. A slurry of pulp-like particles was obtained. The slurry was centrifugalized to separate the pulp-like particles from the mixture of N-methyl-2-pyrrolidone with water. The separated pulp-like particles were washed with ion-exchanged water and dried in the ambient atmosphere. The pulp-like particles had a size between 10 mesh size and 200 mesh size.

The individual potassium titanate fibers had a diameter of between 0.0005 and 0.002 mm and a length of from 0.01 to 0.10 mm.

The cashew resin powder is composed of fine particles having a size between 48 and 200 mesh sizes.

The resultant brake lining was subjected to the determination of the coefficient of friction (friction factor) and an abrasion test each performed in accordance with Japanese Industrial Standard (JIS) D 4411. The results are indicated in Table 1.

TABLE 1

| Coefficient of friction | | Abrasion (cm$^3$/kg-m) |
|---|---|---|
| Temperature (°C.) | Coefficient | |
| 100 | 0.35 | |
| 150 | 0.35 | |
| 200 | 0.34 | 2.5 × 10$^{-7}$ |
| 250 | 0.35 | |
| 300 | 0.34 | |
| 350 | 0.33 | |

Figure 1:
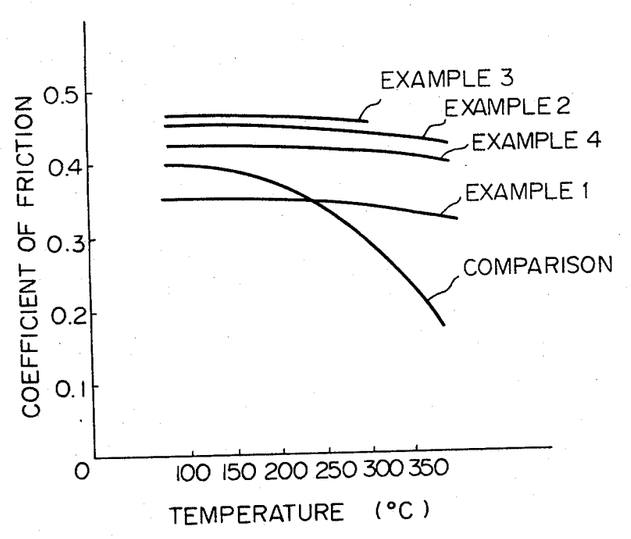
The drawing is a diagram showing relationships between the temperature and the coefficient of friction of each of friction materials obtained in Examples 1 through 4 and a commercially available friction material.

The relationship between the temperature and the coefficient of friction is indicated in the accompanying drawing. In another experiment, it was found that the potassium titanate fibers can be replaced by 10 to 30 parts by weight of ceramic fibers, by 10 to 30 parts by weight of silica fibers, by 10 to 30 parts by weight of silicon carbide type ceramic fibers, by 10 to 30 parts by weight of boron fibers, 10 to 30 parts by weight of magnesia fibers, 10 to 30 parts by weight of alumina fibers and by 10 to 30 parts by weight of slag fibers, each having a diameter of from 0.001 to 0.01 mm and a length of from 0.005 to 5.0 mm, without changing the coefficient of friction and the wear resistance of the resultant friction material.

Also, it was found that 20 parts by weight of the cashew resin powder can be replaced by each of the following members, without changing the coefficient of friction and the wear-resistance of the resultant friction material.

| Material | Amount (parts by weight) |
|---|---|
| Alumina | 1-10 |
| Silica | 1-10 |
| Talc | 1-10 |
| Kaoline | 1-10 |
| Mica | 1-10 |
| Chromium oxide | 1-10 |
| Magnesium oxide | 1-10 |
| Titanium dioxide | 1-10 |
| Copper | 1-20 |
| Copper alloy | 1-20 |
| Zinc | 1-20 |
| Iron | 1-20 |
| Aluminum | 1-20 |
| Barium sulfate | 1-15 |
| Quick lime | 1-15 |
| Calcium phosphate | 1-15 |
| Calcium fluoride | 1-15 |
| Silicon carbide | 1-15 |
| Clay | 1-10 |
| Beryl | 1-10 |
| Mullite | 1-10 |
| Chromite | 1-10 |
| Ceramic | 5 or less |
| Rubber | 1-20 |
| Carbon black | 1-20 |
| Graphite | 1-20 |

Furthermore, it was found that 20 parts by weight of the phenol-formaldehyde resin can be replaced by 5 to 15 parts by weight of an epoxy resin, by 5 to 20 parts by weight of a melamine-formaldehyde resin, or by 5 to 30 parts by weight of an oil-modified phenol-formaldehyde resin or cashew resin-modified phenol-formaldehyde resin, without causing the coefficient of friction and the wear-resistance of the resultant friction material to be changed.

EXAMPLE 2

Nine parts by weight of the same poly-m-phenylene isophthalamide as that mentioned in Example 1, one part by weight of copper powder and 3 parts by weight of barium sulfate powder were mixed with 91 parts by weight of N-methyl-2-pyrrolidone. The resultant solution dispersion was subjected to the same coagulating procedure as that mentioned in Example 1 to provide pulp-like particles each containing fine particles of copper and barium sulfate and having a size ranging between 10 and 200 mesh sizes.

A mixture of 35 parts by weight of the pulp-like particles containing the copper and barium sulfate particles, 15 parts by weight of poly-m-phenylene isophthalamide staple fibers each having a denier of 1.5 and a length of 3 mm, 50 parts by weight of asbestos fibers and 10 parts by weight of a phenol-formaldehyde resin was uniformly dispersed in 10,000 parts by weight of water. The asbestos fibers had a denier of from 0.3 to 10 and a length ranging from 0.5 to 6 mm. The mixture was filtered and dried. The dried mixture was placed in a mold and pressed under the same conditions as those mentioned in Example 1. The properties of the resultant friction material are indicated in Table 2 and the accompanying drawing.

TABLE 2

| Coefficient of friction | | Abrasion (cm$^3$/kg-m) |
|---|---|---|
| Temperature (°C.) | Coefficient | |
| 100 | 0.43 | |
| 150 | 0.45 | |
| 200 | 0.45 | $2.5 \times 10^{-7}$ |
| 250 | 0.44 | |
| 300 | 0.44 | |
| 350 | 0.43 | |

In another experiment, it was found that 50 parts by weight of the asbestos fibers could be replaced by the following materials without causing the friction property and the wear-resistance of the resultant friction material to be degraded.

(1) A mixture of 30 parts by weight of potassium titanate fibers and 20 parts by weight of asbestos fibers.

(2) Mixtures of 5 to 50 parts by weight of ceramic fibers and 0 to 45 parts by weight of asbestos fibers.

(3) Mixtures of 5 to 50 parts by weight of alumina fibers and 0 to 45 parts by weight of asbestos fibers.

EXAMPLE 3

A composition containing a mixture of the following components:

| | |
|---|---|
| 1. poly-m-phenylene isophthalamide pulp-like particles (size: 10–200 mesh size) | 20 parts by weight |
| 2. potassium titanate fibers (diameter: 0.0005–0.002 mm, length: 0.001–0.05 mm) | 40 parts by weight |
| 3. cashew resin powder (size: 48–150 mesh size) | 20 parts by weight |
| 4. phenol-formaldehyde resin powder | 20 parts by weight |
| 5. aluminum sulfate | 7 parts by weight | was prepared in the following manner.

The pulp-like particles and the potassium titanate fibers were placed in a beaker and beaten for about 20 minutes so that the particles and fibers were separated from each other. The beaten mixture was placed in a cylindrical vessel and mixed therein with the cashew resin powder, phenol resin powder and aluminium sulfate. The mixture was agitated in the vessel for about 30 minutes and, then, suspended in water so as to prepare a one % aqueous suspension of the mixture.

The aqueous suspension was subjected to a sheet-making process by using a long net type paper-making machine. The resultant sheet was dried at a temperature of 120° C. while pressing it. A sheet-shaped friction material having a width of 100 cm was obtained.

In order to prepare a clutch facing, the sheet-shaped friction material was cut to form a piece having a width of 10 mm and a length of 30 m, the piece was wound to form a ring having a diameter of 20 cm, and the ring-shaped piece was placed in a mold and pressed at a temperature of 100° C. under a pressure of 200 kg/cm$^2$ for 6 minutes. The resultant product was finished by grinding it to provide a clutch facing.

The clutch facing was subjected to the determination of the coefficient of friction thereof and an abrasion test in accordance with JIS D 4311. The results are indicated Table 3 and the accompanying drawing.

TABLE 3

| Coefficient of friction | | Abrasion (cm$^3$/kg-m) |
|---|---|---|
| Temperature (°C.) | Coefficient | |
| 100 | 0.43 | |
| 150 | 0.44 | $2.1 \times 10^{-7}$ |
| 200 | 0.45 | |
| 250 | 0.45 | |

Also, the sheet-shaped friction material prepared above could be converted into another product by cutting it into a desired patterned piece, and by pressing the cut piece or a plurality of cut pieces superposed on each other, at an elevated temperature under pressure. The product is suitable for use in an oil phase.

In another experiment, it was confirmed that the sheet-shaped friction material could be produced by using a tubular net type paper-making machine in place of the long net type paper-making machine.

EXAMPLE 4

The same pulp-like particle-producing procedures as those described in Example 2 were carried out, except that one part of copper powder and 3 parts by barium sulfate powder were replaced by 9 parts by weight of potassium titanate fibers, 3 parts by weight of barium sulfate and one part by weight of brass powder. The resultant pulp-like particles contained therein the potassium titanate fibers and particles of the barium sulfate and the brass, which were wrapped with layers of poly-m-phenylene isophthalamide. The pulp-like particles had the following composition.

| | |
|---|---|
| Poly-m-phenylene isophthalamide | 40.9% by weight |
| Potassium titanate fibers | 40.9% by weight |
| Barium sulfate powder | 13.6% by weight |
| Brass powder | 4.6% by weight |

The same friction material-producing procedures as those described in Example 1 were carried out, by using a composition of 80 parts by weight of the above-mentioned pulp-like particles containing the potassium titanate fibers, barium sulfate powder and brass powder, 5 parts by weight of poly-p-phenylene terephthalamide fibers having a denier of 1.5 and a length of 5.0 mm, 15 parts by weight of asbestos fibers having a denier of from 0.3 to 10 and a length of from 0.5 to 6.0 mm and 10 parts by weight of a phenol-formaldehyde resin.

The properties of the resultant friction material are indicated in Table 4 and the accompanying drawing.

For comparison, properties of a commercially obtained conventional friction material are indicated in Table 4 and the accompanying drawing.

TABLE 4

| Temperature (°C.) | Coefficient of friction | | Abrasion cm³/kg-m | |
|---|---|---|---|---|
| | Coefficient | | | |
| | Example 4 | Comparison | Example 4 | Comparison |
| 100 | 0.42 | 0.40 | | |
| 150 | 0.42 | 0.38 | | |
| 200 | 0.42 | 0.37 | $2.15 \times 10^{-7}$ | $2.4 \times 10^{-7}$ |
| 250 | 0.43 | 0.32 | | |
| 300 | 0.42 | 0.30 | | |
| 350 | 0.40 | 0.22 | | |

Tables 1 through 4 and the accompanying drawing clearly show that the coefficient of friction of each of the friction materials of Examples 1 through 4 are substantially constant over the range of temperature of from 100° to 350° C. However, in the case of the commercially obtained conventional friction material, its coefficient of friction remarkably decreases with the elevation of temperature.

We claim:

1. A friction material comprising the elements of:
   (A) 5 to 70% by weight of pulp-like particles consisting essentially of a heat-resistant aromatic polymeric material;
   (B) 1 to 70% by weight of a fibrous material comprising at least one member selected from the group consisting of inorganic fibrous materials and heat-resistant organic fibrous materials;
   (C) 1 to 35% by weight of a friction-regulating agent and;
   (D) 5 to 40% by weight of a thermosetting polymeric resin.

2. A friction material as claimed in claim 1, wherein said pulp-like particles are in an amorphous shape and capable of joining with each other to form aggregations.

3. A friction material as claimed in claim 1, wherein the size of said pulp-like particles is a 10 mesh size or smaller.

4. A friction material as claimed in claim 1, wherein said heat-resistant aromatic polymeric material has a softening point of 150° C. or more.

5. A friction material as claimed in claim 1, wherein said heat-resistant aromatic polymeric material contains at least 70% by weight of at least one member selected from the group consisting of:
   (A) aromatic polyamides containing at least 70 molar % of at least one recurring unit selected from the group consisting of those of the formulae (I) and (II):

$$— CO — Ar_1 — CONH — Ar_2 — NH —  \quad (I)$$

and $$— NH — Ar_3 — CO —  \quad (II)$$

wherein $Ar_1$, $Ar_2$ and $Ar_3$ respectively represent independently from each other, an unsubstituted or substituted divalent aromatic radical;
   (B) nitrogen containing heterocyclic polymers selected from the group consisting of:
      (a) aromatic polyamide imides containing at least 70 molar % of at least one recurring unit selected from those of the formula (III):

wherein X represents a divalent bond selected from the group consisting of alkylene, alkylidene, cycloalkylene, and cycloalkylidene radicals each having 1 to 6 carbon atoms, and $$—O—, —S—, —SO_2—, —N=N—,$$

$$—N=N—, \ \underset{R}{\overset{R}{-Si-}} \ \text{and} \ \underset{R}{\overset{O}{-P-O-}}$$

wherein R represents an organic group having 1 to 10 carbon atoms; $R^1$, $R^2$ and $R^3$ respectively represent, independently from each other, a member selected from the group consisting of a hydrogen atom, alkyl radicals having 1 to 6 carbon atoms, alkoxyl radicals having 1 to 3 carbon atoms, aryloxy radicals having 1 to 3 carbon atoms, alkoxy-carboxyl radicals having 2 to 10 carbon atoms, and halogen atoms, and;
   n and m respectively represent, independently from each other, zero or an integer of from 1 to 3;
      (b) aromatic polyamide imidazoles containing at least 70 molar % of at least one recurring unit selected from those of the formula (IV):

wherein X, $R^1$, $R^2$, $R^3$, m and n are as defined above;

(c) aromatic polyimides containing at least 70 molar % of at least one recurring unit selected from those of the formula (V):

(V)

wherein X, $R^1$, $R^2$, $R^3$, m and n are as defined above;

(d) aromatic polyazoles selected from the group consisting of polybenzimidazoles, polybenzoxazoles and polybenzthiazoles, each unsubstituted or substituted by at least one member selected from the group consisting of alkyl radicals having 1 to 2 carbon atoms, alkoxyl radicals having 1 to 2 carbon atoms and halogen atoms;

(e) polymers selected from the group consisting of polyquinazoline-dions, polybenzoxadinones, polyquinazolones and polyquinoxalines, and;

(f) polymers selected from the group consisting of polythiazoles, polyoxazoles, polyoxadiazoles, polyhydantoins and polyparabanic acid;

(C) aromatic polyamide hydrazides containing at least 70 molar % of at least one recurring unit selected from those of the formula (VI):

(VI)

wherein $R^4$ represents a member selected from the group consisting of a hydrogen atoms, alkyl radicals having 1 to 2 carbon atoms, alkoxyl radicals having 1 to 2 carbon atoms and halogen atoms;

(D) polymers containing at least 70 molar % of at least one recurring unit selected from those of the formula (VII):

(VII)

wherein $R^4$ represents a radical selected from those of the following formulae:

-continued and and X, $R^1$, $R^2$, $R^3$, m and n are as defined above;

(E) polymers selected from the group consisting of aromatic polyhydrazides and aromatic polyureas, and

(F) polyethers selected from the group consisting of polyphenylene oxides and polyarylene oxides.

6. A friction material as claimed in claim 5, wherein $Ar_1$, $Ar_2$ and $Ar_3$ in the formulae (I) and (II) respectively comprise, independently from each other, a single aromatic ring, or two or more aromatic rings that are condensed together, or are linked together, by a single bond, or by a bridging atom or radical, and which is oriented either meta or para.

7. A friction material as claimed in claim 5, wherein $Ar_1$, $Ar_2$ and $Ar_3$ in the formulae (I) and (II) are respectively selected, independently from each other, from the group consisting of the radicals of the formulae:

-continued and wherein $R^5$ represents a member selected from the group consisting of lower alkyl radicals having 1 to 6 carbon atoms, lower alkoxy radicals having 1 to 6 carbon atoms, halogen atoms and a nitro radical, l represents zero or an integer of from 1 to 4 and $X^1$ represents a member selected from the group consisting of wherein $Y^1$ represents a member selected from the group consisting of a hydrogen atom and lower alkyl radicals having 1 to 6 carbon atoms.

8. A friction material as claimed in claim 5, wherein $Ar_1$, $Ar_2$ and $Ar_3$ in the formulae (I) and (II) respectively represent, independently from each other, a member selected from p-phenylene radical, m-phenylene radical, biphenylene radical and radicals of the formulae:

and wherein $X^2$ represents a member selected from in which $Y^2$ represents a hydrogen atom or a alkyl radical having 1 to 3 carbon atoms.

9. A friction material as claimed in claim 5, wherein said aromatic polyamide imide comprises 70 molar % or more of at least one recurring unit of the formula (III) and 30 molar % or less of at least one recurring unit selected from the group consisting of:
 polyamide imide recurring units different from those of the formula (III),
 polyamidebenzimidazole recurring units,
 aromatic polyimide recurring units,
 aromatic polyamide recurring units,
 polyazole recurring units,
 polybenzazole recurring units,
 polyhydantoin recurring units,
 polyparabanic recurring units,
 polyquinazoline-dione recurring units,
 polyquinazolone recurring units,
 polyquinaxaline recurring units, and
 polyoxadinone recurring units.

10. A friction material as claimed in claim 9, wherein said polyamide imide recurring unit different from those of the formula (III) is selected from the group consisting of those of the following formulae:

and wherein $R^2$ and m are as defined hereinbefore.

11. A friction material as claimed in claim 1, wherein said inorganic fibrous material is selected from the group consisting of asbestos fibers, glass fibers, ceramic fibers, kaoline fibers, potassium titanate fibers, silica fibers, bauxite fibers, silicon carbide type ceramic fibers, boron fibers, magnesia fibers, alumina fibers, rock wool fibers, slag fibers, metal fibers and anhydrous gypsum fibers.

12. A friction material as claimed in claim 1, wherein said heat-resistant organic fibrous material is selected from the group consisting of:
 (A) staple fibers consisting essentially of at least one aromatic polyamide containing at least 70 molar % of at least one recurring unit selected from the group consisting of those of the formulae (I) and (II),
 (B) staple fibers consisting essentially of at least one nitrogen containing heterocyclic polymer selected from the group consisting of:
  (a) aromatic polyamide imides containing at least 70 molar % of at least one recurring unit selected from those of the formula (III);
  (b) aromatic polyamide imidazoles containing at least 70 molar % of at least one recurring unit selected from those of the formula (IV);
  (c) aromatic polyimides containing at least 70 molar % of at least one recurring unit selected from those of the formula (V);

(d) aromatic polyazoles selected from the group consisting of polybenzimidazoles, polybenzoxazoles and polybenzthiazoles, each unsubstituted or substituted by at least one member selected from the group consisting of alkyl radicals having 1 to 2 carbon atoms, alkoxyl radicals having 1 to 2 carbon atoms and halogen atoms;

(e) polymers selected from the group consisting of polyquinazoline-dions, polybenzoxadinones, polyquinazolones and polyquinoxalines, and;

(f) polymers selected from the group consisting of polythiaxoles, polyoxazoles, polyoxadiazoles, polyhydantoins and polyparabanic acid;

(C) staple fibers consisting essentially of at least one aromatic polyamide hydrazide containing at least 70 molar % of at least one recurring unit selected from those of the formula (VI);

(D) staple fibers consisting essentially of at least one polymer containing at least 70 molar % of at least one recurring unit selected from those of the formula (VII);

(E) staple fibers consisting essentially of at least one polymers selected from the group consisting of aromatic polyhydrazides and aromatic polyureas;

(F) staple fibers consisting essentially of at least one polyether selected from the group consisting of polyphenylene oxide and polyarylene oxide, and;

(G) carbon staple fibers.

13. A friction material as claimed in claim 1, wherein the individual fibers in said fibrous materials has a denier of 10 or less and a length of 10 mm.

14. A friction material as claimed in claim 1, wherein said friction-regulating agent comprises at least one member selected from the group consisting of finely divided alumina, silica, talc, kaoline, mica, chromium oxide, magnesium oxide, titanium dioxide, copper, copper alloys, zinc, iron, aluminum, barium sulfate, quick lime, calcium phosphate, calcium fluorite, silicon carbide, clay, beryl, mullite, chromite, ceramics, cashew nut resin, vulcanized and unvulcanized rubbers, carbon black and graphite.

15. A friction material as claimed in claim 1, wherein said thermosetting polymeric resin comprises at least one member selected from the group consisting of phenolic resins, melamine resins, urea resins and epoxy resins.

16. A friction material as claimed in claim 1, wherein the entire or partial amount of at least one member selected from the group consisting of said fibrous material and said friction-regulating agent is contained within said pulp-like particles.

* * * * *